United States Patent [19]
Ilcisin et al.

[11] Patent Number: 5,838,398
[45] Date of Patent: Nov. 17, 1998

[54] CATHODE STRUCTURE FOR A PLASMA ADDRESSED LIQUID CRYSTAL DISPLAY PANEL

[75] Inventors: Kevin J. Ilcisin; Thomas S. Buzak, both of Beaverton; Paul C. Martin, Sunriver, all of Oreg.

[73] Assignee: Tektronix, Inc., Wilsonville, Oreg.

[21] Appl. No.: 926,218

[22] Filed: Sep. 9, 1997

Related U.S. Application Data

[60] Provisional application No. 60/024,232 Sep. 30, 1996.
[51] Int. Cl.$^6$ .................................................. G02F 1/133
[52] U.S. Cl. .......................... 349/32; 315/169.4; 313/584
[58] Field of Search .................................. 349/32; 345/37; 315/169.4

[56] References Cited

U.S. PATENT DOCUMENTS 5,428,263   6/1995   Nagano ................................. 313/585

*Primary Examiner*—William L. Sikes
*Assistant Examiner*—James A. Dudek
*Attorney, Agent, or Firm*—John D. Winkelman; John Smith-Hill

[57] ABSTRACT

A composite electrode in a channel substrate for a PALC display panel comprises a metal core and a surface layer of a fullerene.

13 Claims, 1 Drawing Sheet

CATHODE STRUCTURE FOR A PLASMA ADDRESSED LIQUID CRYSTAL DISPLAY PANEL

CROSS REFERENCED TO RELATED APPLICATIONS

This application claims the benefit of U.S. Provisional application Ser. No. 60/024,232, filed Sep. 30, 1996.

BACKGROUND OF THE INVENTION

This invention relates to a cathode structure for a plasma addressed liquid crystal display panel.

U.S. Pat. No. 5,077,553 discloses apparatus for addressing data storage elements. A practical implementation of the apparatus shown in U.S. Pat. No. 5,077,553 is illustrated schematically in FIG. 4 of the accompanying drawings.

The display panel shown in FIG. 4 comprises, in sequence from below, a polarizer 2, a channel substrate 4, a cover sheet 6 (commonly known as a microsheet), a layer 10 of electro-optic material, an array of parallel transparent data drive electrodes (only one of which, designated 12, can be seen in the view shown in FIG. 2), an upper substrate 14 carrying the data drive electrodes, and an upper polarizer 16. The channel substrate 2 is typically made of glass and is formed with multiple parallel channels 20 in its upper main face. The channels 20, which are separated by ribs 22, are filled with an ionizable gas, such as helium. An anode 24 and a cathode 26 are provided in each of the channels 20. The channels 20 are orthogonal to the data drive electrodes and the region where a data drive electrode crosses a channel (when viewed perpendicularly to the panel) forms a discrete panel element 28. Each panel element can be considered to include elements of the layer 10 and the upper and lower polarizers 2 and 16. In the case of a color display panel, the panel elements include color filters (not shown) between the layer 10 and the upper substrate 14. The region of the upper surface of the display panel that bounds the panel element constitutes a single pixel 30 of the display panel.

The anodes in the several channels may be connected together by a rail that is held at ground potential. When a suitable negative voltage is applied to the cathode in one of the channels, the gas in that channel forms a plasma that provides a conductive path at the lower surface of the cover sheet 6. If the data drive electrode is at ground potential, there is no significant electric field in the volume element of electro-optic material and the panel element is considered to be off, whereas if the data drive electrode is at a substantially different potential from ground, there is a substantial electric field in that volume element of electro-optic material and the panel element is considered to be on.

It is conventional to assemble a display panel of the kind shown in FIG. 4 by forming a channel substrate assembly, including the channel substrate and the cover sheet, forming an upper substrate assembly, including the upper substrate, the data drive electrodes, and the layer of electro-optic material, and attaching the upper substrate assembly to the channel substrate assembly. In manufacture of the channel substrate assembly, the cover sheet is placed over the upper surface of the channel substrate and is frit sealed to the channel substrate around the periphery thereof.

It has been proposed that the cathodes in a PALC display panel should be fabricated using a nickel or chromium base layer having a coating of a finely divided rare earth hexaboride, such as $LaB_6$. One reason for using the rare earth hexaboride as the coating material on the nickel or chromium base layer is that it has a moderate heat of sublimation so that it is sputter resistant.

The coating of rare earth hexaboride may be formed on the metal base layer by cataphoretic deposition. Thus, the base layer is formed by depositing a blanket layer of metal over the entire upper surface of the channel substrate and etching back the blanket layer to form two strips in each channel. The strips are connected together by the ground rail, which extends along one edge of the channel substrate, so that the strips form a single electrically continuous electrode. The substrate is placed in an electrophoretic deposition cell containing a medium from which the rare earth hexaboride can be deposited by cataphoresis. The electrode on the channel substrate is connected as cathode to a DC voltage source and another electrode in the electrophoretic deposition cell is connected to the voltage source as anode. A coating of the rare earth hexaboride is formed at the cathode. After the desired coating has been formed, the substrate is removed from the cell and the composite conductive layer (metal plus rare earth hexaboride) is selectively etched to form two discrete electrodes in each channel of the substrate. One electrode in each channel serves as an anode and the other electrode serves as a cathode.

Carbon exists in several different molecular forms. One form of the carbon molecule is known as the fullerene. There are at least three fullerenes, characterized by the number of carbon atoms in the molecule. The C60 fullerene molecule is composed of 60 carbon atoms arranged in a generally spherical configuration.

SUMMARY OF THE INVENTION

In accordance with a first aspect of the invention there is provided a method of forming an electrode on a channel member for a PALC panel, said channel member having a plurality of channels in an upper surface thereof, comprising (a) forming at least one metal strip in a channel of the channel member, and (b) forming a surface layer of fullerene on the metal strip, whereby an electrode comprising a metal core and a surface layer of said fullerene is formed.

In accordance with a second aspect of the invention there is provided a method of forming an electrode on a channel member for a PALC panel, said channel member having a plurality of channels in an upper surface thereof, comprising (a) forming at least one metal strip in at least one channel of the channel member, and (b) forming a layer of a fullerene on the metal strip, whereby an electrode comprising a core including said metal strip and a surface layer of said fullerene is formed.

In accordance with a third aspect of the invention there is provided a method of forming an electrode on a channel member for a plasma addressed liquid crystal panel, comprising depositing an electrode metal in accordance with a predetermined pattern, and cataphoretically depositing a fullerene on the electrode metal.

BRIEF DESCRIPTION OF THE DRAWINGS

For a better understanding of the invention, and to show how the same may be carried into effect, reference will now be made, by way of example, to the accompanying drawings, in which.

In the several figures of the drawings, like reference numerals are used to denote corresponding elements.

Words of orientation and position, such as upper and lower, are used in the specification to establish orientation relative to the drawings are not intended to be limiting in a absolute sense.

DETAILED DESCRIPTION

Figure 1:
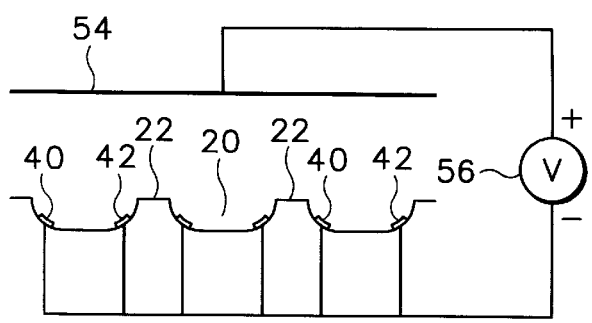
FIG. 1 is a partial sectional view of the channel substrate of a plasma addressed liquid crystal display panel in an electrophoretic deposition cell.
Figure 2:
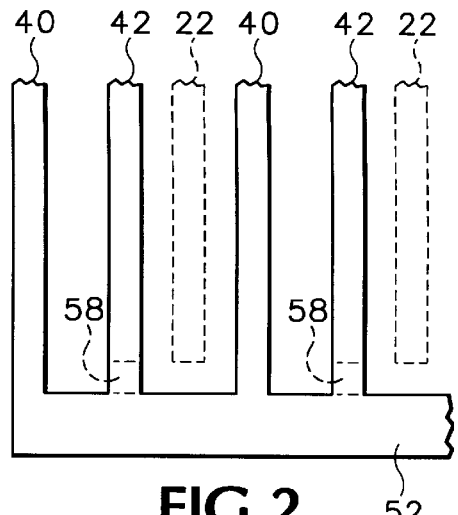
FIG. 2 is a schematic plan view of the channel substrate shown in FIG. 1.

The channel substrate shown in FIGS. 1 and 2 has two metal strips 40 and 42 in each of the channels. The structure shown in FIGS. 1 and 2 may be fabricated by depositing a blanket layer of metal over the entire upper surface of the substrate and etching back the blanket layer using known photolithographic techniques to form the desired pattern of strips. The strips 40 and 42 are connected together along one edge of the channel substrate by a rail 52, which extends along one edge of the channel substrate, and thus form a single electrically continuous electrode. A suitable metal for the strips 40, 42 and the rail 52 is chromium, because it adheres well to glass.

Figure 3:
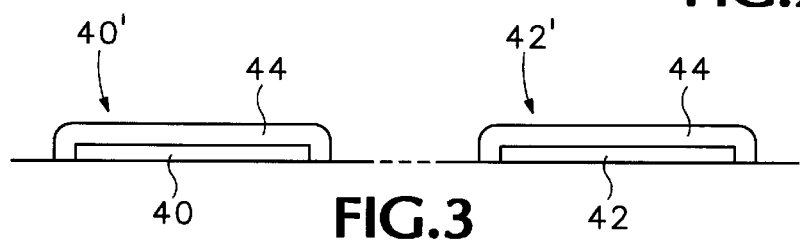
FIG. 3 is an enlarged view of a detail of FIG. 1, illustrating the structure of one of the electrodes in the channel substrate after processing in the plasma discharge cell.
Figure 4:
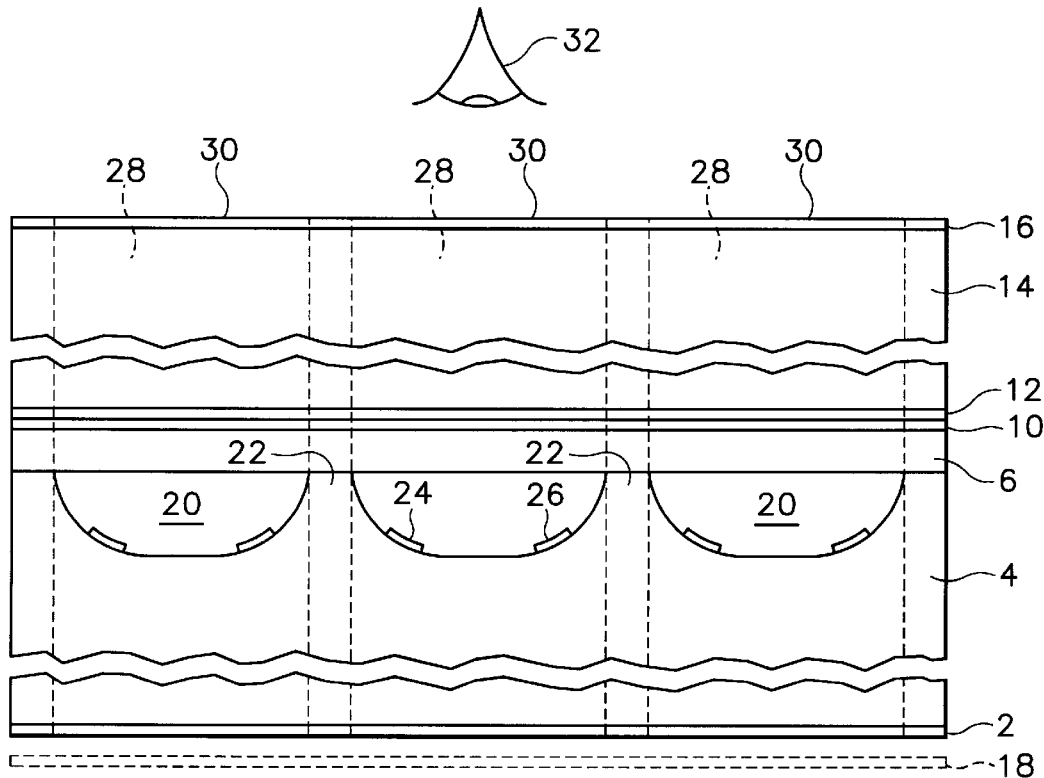
FIG. 4 illustrates schematically a sectional view of a PALC display panel in accordance with the prior art.

A cover layer 44 (FIG. 3) of C60 fullerene is formed over the strips 40 and 42 by cataphoretic deposition, using the electrode 40, 42 and an electrode 54, connected as cathode and anode respectively to a DC voltage source 56 in an electrophoresis cell containing a suitable medium. In this manner, two composite strips 40', 42', each composed of a metal adhesion layer and a cover layer of C60 fullerene, are formed in each channel.

After the cover layer 44 of C60 fullerene has been formed, the strip 42' of each pair is separated from the other strip of the pair, e.g. by etching away the portions 58.

The cover sheet is then placed over the channel substrate and the channel substrate assembly is frit sealed to the cover sheet. The channel substrate assembly is attached to the upper substrate assembly in conventional fashion to form a complete PALC display panel.

The cathode structure that is produced by the method described above has an advantage over the cathode structure employing a coating of rare earth hexaboride. In particular, the C60 fullerene has a higher heat of sublimation than the rare earth hexaborides that have previously been used, and therefore the cathode structure is more resistant to sputtering damage.

It will be appreciated that the invention is not restricted to the particular embodiment that has been described, and that variations may be made therein without departing from the scope of the invention as defined in the appended claims and equivalents thereof. For example, although for the sake of convenience in processing the C60 fullerene layer may be formed on both the metal strips in each channel, the invention is not restricted to the C60 fullerene layer being formed on both strips, since the advantage of the C60 fullerene layer is obtained principally at the cathode.

We claim:

1. A method of forming an electrode on a channel member for a PALC panel, said channel member having a plurality of channels in an upper surface thereof, comprising:

(a) forming at least one metal strip in a channel of the channel member, and (b) forming a surface layer of fullerene on the metal strip, whereby an electrode comprising a metal core and a surface layer of said fullerene is formed.

2. A method according to claim 1, wherein the fullerene is C60 fullerene.

3. A method according to claim 1, wherein step (a) comprises forming at least two metal strips in a channel of the channel member and step (b) comprises forming a surface layer of fullerene on at least one of the metal strips formed in step (a).

4. A method according to claim 3, wherein step (b) comprises forming a surface layer of fullerene on each metal strip formed in step (a).

5. A method of forming an electrode on a channel member for a PALC panel, said channel member having a plurality of channels in an upper surface thereof, comprising:

(a) forming at least one metal strip in at least one channel of the channel member, and (b) forming a layer of a fullerene on the metal strip, whereby an electrode comprising a core including said metal strip and a surface layer of said fullerene is formed.

6. A method according to claim 5, wherein the fullerene is C60 fullerene.

7. A method according to claim 5, wherein step (a) comprises forming at least two metal strips in at least one channel of the channel member and step (b) comprises forming a layer of a fullerene on at least one of the strips formed in step (a).

8. A method according to claim 7, wherein step (b) comprises forming a layer of a fullerene on each of the metal strips formed in step (a).

9. A method of forming an electrode on a channel member for a plasma addressed liquid crystal panel, comprising:

depositing an electrode metal in accordance with a predetermined pattern, and cataphoretically depositing a fullerene on the electrode metal.

10. A method according to claim 9, wherein the fullerene is C60 fullerene.

11. A channel member for a PALC panel, said channel member having a plurality of channels in an upper surface thereof and having at least one electrode in one of said channels, wherein said one electrode has a composite structure and comprises a core that includes a metal and a surface layer of a fullerene.

12. A channel member according to claim 11, wherein the fullerene is C60 fullerene.

13. A channel member according to claim 11, wherein the channel member has two electrodes in each channel and at least one electrode in each channel has a composite structure and comprises a core that includes a metal and a surface layer of a fullerene.

* * * * *